United States Patent [19]

Farinacci

[11] 4,342,437
[45] Aug. 3, 1982

[54] HIGH ALTITUDE PLATFORM AIR DROP SYSTEM

[75] Inventor: Anthony L. Farinacci, Baldwin, Md.

[73] Assignee: The United States of America as represented by the Secretary of the Army, Washington, D.C.

[21] Appl. No.: 192,669

[22] Filed: Oct. 1, 1980

[51] Int. Cl.$^3$ .............................................. B64D 1/08
[52] U.S. Cl. ........................... 244/137 R; 244/138 R; 244/149
[58] Field of Search ................... 244/137 R, 147, 149, 244/138 R, 151 B, 150, 152; 108/51.1, 55.1

[56] References Cited

U.S. PATENT DOCUMENTS

| | | | |
|---|---|---|---|
| 2,768,802 | 10/1956 | DeJean | 244/138 R |
| 3,323,762 | 6/1967 | Mylrea et al. | 244/138 A |
| 3,724,788 | 4/1973 | Petry et al. | 244/137 R |
| 4,227,663 | 10/1980 | Ramsay et al. | 244/149 |

FOREIGN PATENT DOCUMENTS 782640  9/1957  United Kingdom ............ 244/138 R

OTHER PUBLICATIONS

Powell Pressed Steel Company Hubbard, Pamphlet in Search File.

Primary Examiner—Galen L. Barefoot
Assistant Examiner—Harry A. Smith
Attorney, Agent, or Firm—Nathan Edelberg; Robert P. Gibson; Lawrence E. Labadini

[57] ABSTRACT

An improved device for the air dropping of platform-mounted cargo is presented wherein a multi-staged parachute system allows for a rapid descent during the initial phase of the trajectory and then reduces the rate of descent during the terminal stage to allow for a safe landing.

10 Claims, 8 Drawing Figures

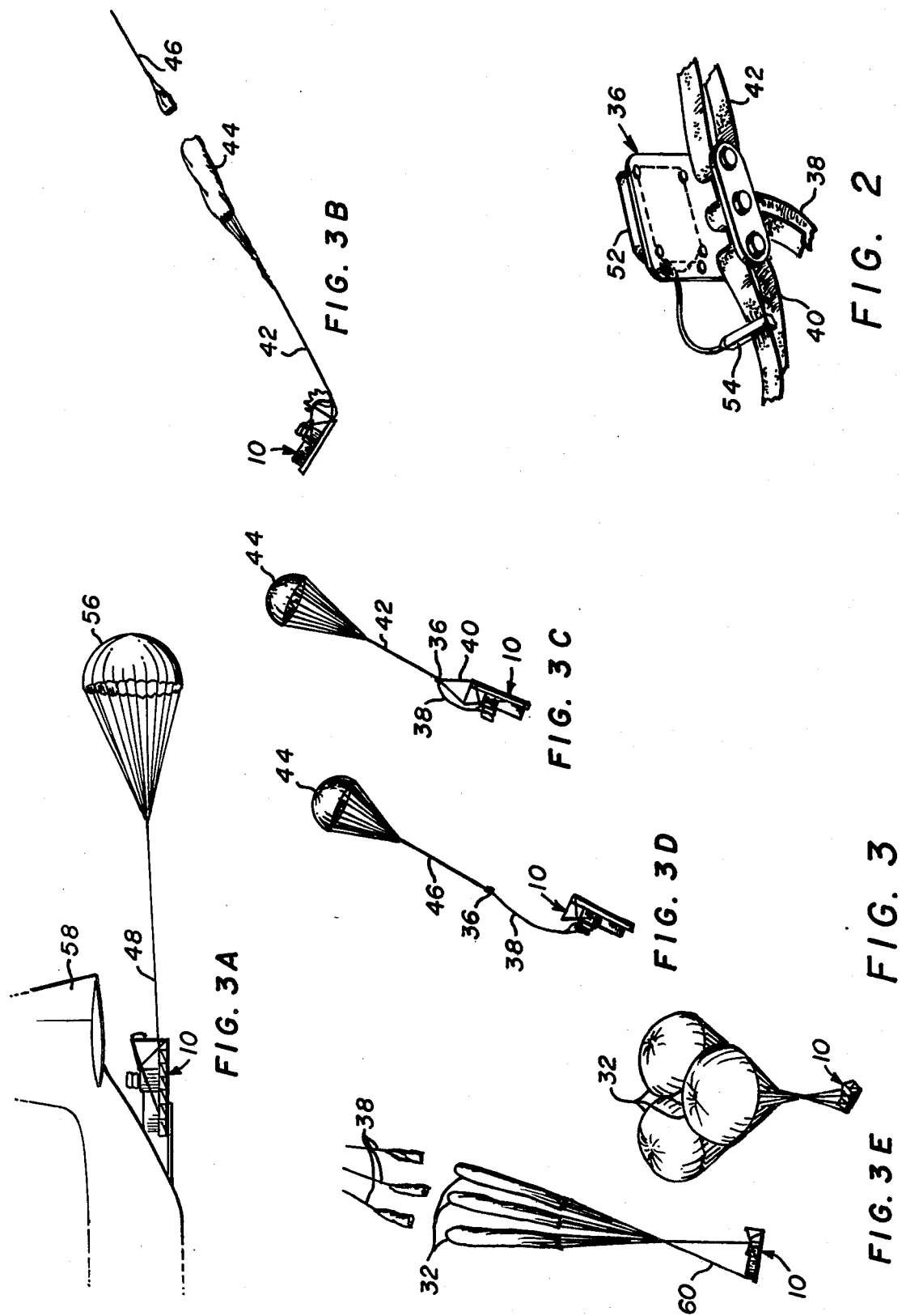

HIGH ALTITUDE PLATFORM AIR DROP SYSTEM

The invention described herein may be purchased, used and licensed by or for the Government for governmental purposes without the payment to me of any royalty thereon.

BACKGROUND OF THE INVENTION (1) Field of the Invention

The present invention relates to a device for the air dropping of platform mounted cargoes. Specifically, the present invention relates to a device utilizing a multi-staged parachute system which allows for a stabilized high speed descent of platform mounted cargo from aircraft operating at altitudes of up to 25,000 feet. Accordingly, some of the general objects of the present invention are to orient a load which is to descend by parachute in a low drag attitude and to maintain this attitude by limiting pitch oscillations to plus or minus 20° in relation to the desired flight path trajectory.

(2) Description of the Prior Art

While on air drop missions, aircraft are vulnerable to surface-to-air missiles. To reduce this vulnerability, it has been shown that the air drop must be performed at higher altitudes than presently utilized. The desired range in altitude is up to 25,000 feet. When air dropping cargo from such high altitudes it is necessary to minimize wind drift error in order to assure that the cargo reaches the target area. In order to minimize the wind drift error, it becomes necessary to have the cargo traverse a greater portion of the trajectory path in a shorter period of time than is normally required for lower altitude air drops. This is accomplished by reducing drag and, as a result, increasing the rate of descent. However, the rate of descent must be appreciably reduced, before the cargo touches down, to be compatible with ground impact requirements.

A system designed for high altitude, high speed descent must also be provided with some means to stabilize the platform mounted cargo against pitch oscillations. It would also be desirable to provide a stabilized high speed descent device which could be utilized with conventional air drop aircraft.

Prior art platform mounted air drop devices are incapable of achieving stabilized high speed descent when used at high altitudes. While stabilized high speed descent systems for air dropping containers from high altitudes are known, these prior systems are not applicable to the air dropping of platform mounted cargo. This lack of applicability results from the fact that the dimensions and weight distribution of platform mounted cargo produces a high degree of instability when using systems designed for the air drop of containers.

Accordingly, the present invention has as some of its numerous objects the ability to increase the rate of descent during the initial stage of the drop of platform mounted cargo, to reduce wind drift and to reduce the rate of descent during the terminal stage of the drop of such cargo in order to meet ground impact requirements.

SUMMARY OF THE PRESENT INVENTION

The present invention overcomes the above-discussed disadvantages and other deficiencies of the prior art by providing an improved device for the air dropping of platform mounted cargo and a delivery technique employing such device. A stabilized high speed descent air drop technique in accordance with the present invention includes serially deploying three separate parachutes at predetermined altitudes. The first parachute is used to extract the platform from the transporting aircraft. This parachute is attached directly to the cargo by a conventional 35 K coupling. One spool of the coupling is attached to a second parachute. This second parachute stabilizes the cargo and allows the high speed descent. When the extraction parachute is released from the cargo, by the release mechanism associated with the coupling, it exerts enough force upon the stabilizing parachute to deploy it.

The stabilizing parachute is connected to bridle lines by a three spool link. This three spool link contains a barometrically actuated ballistic knife cutter. The bridle lines are attached to an aftward extension of the platform which also serves as a carrier for the stabilizing and main parachutes. This aftward extension is designed so as to contribute an aerodynamic effect which aids in stabilizing the platform during the high speed descent.

At a predetermined altitude the ballistic knife cutter severs the line which connects the bridle to the stabilizing parachute. A third line connected to the three spool link is also attached to the main recovery parachute. When the line from the bridle to the stabilizing parachute is severed, the stabilizing parachute exerts enough force upon the main recovery parachute or parachutes to cause deployment thereof.

The main recovery parachutes slow descent to allow proper ground impact and are connected to the platform in the conventional manner.

BRIEF DESCRIPTION OF THE DRAWINGS

The present invention may be better understood and its numerous objects and advantages will be apparent to those skilled in the art by reference to the accompanying drawings wherein like reference numerals refer to like elements in the several FIGURES, and in which:

FIG. 2 is a side view of the barometric sensitive ballistic knife cutter employed in the embodiment of FIG. 1; and FIGS. 3(a-e) are schematic illustrations of the cargo delivery technique of the present invention employing the improved high altitude air drop device of FIG. 1.

DESCRIPTION OF THE PREFERRED EMBODIMENT

Figure 1:
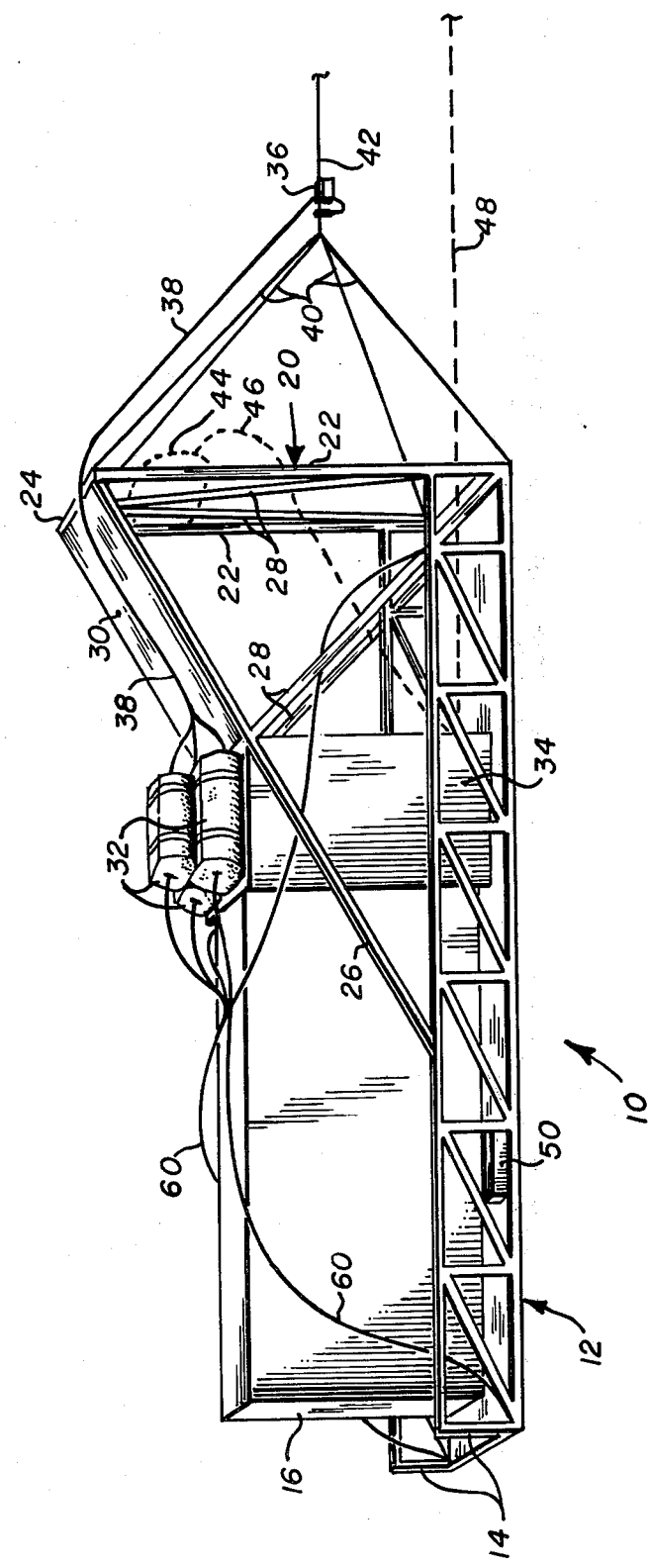
FIG. 1 is a perspective view of the improved high altitude air drop device in accordance with a preferred embodiment of the present invention.

Referring to FIG. 1, a platform assembly for an improved high altitude air drop device is seen at 10. Assembly 10 includes a conventional platform 12 which may consist of a series of rail connected panels. The panels are typically built-up sandwich structures having two skins separated by core material. This core material may be a honeycomb construction of paper or aluminum or either balsa or aluminum extrusions. Platform 12 is attached to two reinforcement trusses 14. These trusses 14 are preferably made from $2.5'' \times 2.5'' \times \frac{1}{8}''$ square tubing, of ASTMA-500 steel grade C, with the top member of the trusses being a square tube $3'' \times 3'' \times \frac{1}{4}''$. The load 16 is secured to platform 12 by conventional rigging, not shown.

A bridle attachment frame, indicated generally at 20, is connected to both of trusses 14. Frame 20 is constructed from two unright posts 22 which have their first ends connected to respective ends of trusses 14. The second ends of posts 22 are interconnected by a cross-member 24. Posts 22 are further attached, at their second ends, to a first end of each of a pair of angled support posts 26. The second ends of posts 26 are, in turn, each attached to a truss 14. Positioned between support posts 26 and trusses 14, and also positioned between post 24 and each of posts 22, are struts 28. These struts impart additional strength to frame 20. A panel 30 is attached to both of posts 26 and cross-member 24. Panel 30, which is preferably of honeycomb construction in the interest of strength, forms a ramp over which recovery parachutes 32 will travel during their deployment. Panel 30 also provides an aerodynamic effect which aids in stabilizing assembly 10.

Recovery parachutes 32 are positioned atop a housing 34. Parachutes 32 may be single or multiple (clusters) 100-foot diameter solid flat circular parachutes configured with appropriate reefing means to limit opening forces to acceptable levels. Housing 34 is preferably constructed of plywood. Load 16 is capable of partly entering housing 34. Recovery parachutes 32 are rigged to assembly 10, in a conventional manner, by line 60. Usually the rigging is connected to the corners of platform 12. The release mechanism of parachutes 32 is attached to a three spool link 36 by line 38. Three spool link 36 is further connected, at one end, to the first ends of four bridle lines 40 and at the second end to a line 42 which extends from a stabilizing parachute 44. Stabilizing parachute 44 is not shown in FIG. 1 but will be secured to cross-member 24 of frame 20 before it is deployed. Stabilizing parachute 44 may be a 10, 12, 15 or 22 foot diameter ring slot parachute or ring slot parachute reefed to equivalent drag areas. The second ends of the four bridle lines 40 are attached to the corners of frame 20.

It has been established that the preferred length of bridle lines 40, for platform lengths of 8 to 28 feet with cargo weights of 2,500 and 35,000 lbs, from the attachment points on frame 20 to its confluence at the 3 spool link 36 is such that the distance from the plane defined by frame 20 to the parallel plane of the confluence point is from 4 to 8 feet.

During the high speed descent stabilizing parachute 44 and the aerodynamic surfaces of assembly 10, e.g. panel 30, provide a restoring torque. This maintains the cargo in a preferred equilibrium attitude relative to the windstream direction.

The release mechanism of stabilizing parachute 44 is connected to a conventional "35 K" spool, not shown, by line 46. The "35 K" spool is further connected to load 16 and a line 48 from the extraction parachute.

The assembly 10 is further provided with a conventional "35 K" coupling release mechanism 50. The "35 K" coupling is a piece of standard U.S. Army air drop equipment used to transfer the force of the extraction parachute. As the cargo exits the aircraft the link separates and redirects the force of the extraction parachute to a deployment line which deploys the stabilization parachute. Release mechanism 50 is mounted on platform 12 in an opening provided within either of trusses 12. Release mechanism 50 may be of any conventional type which will release the "35 K" spool after assembly 10 has been extracted from the aircraft.

FIG. 2 illustrates three link spool 36. Spool 36 contains a barometric sensor 52. Sensor 52 activates a ballistic knife cutter 54 at a predetermined altitude. Cutter 54 then severs bridle lines 40 from spool 36 whereby the main parachutes 32 will be deployed by line 38.

FIGS. 3(a-e) illustrate a sequence of events in air dropping platform assembly 10. FIG. 3A is the extraction of assembly 10 from aircraft 58. This is accomplished by extraction parachute 56 which is secured to load 16 through a "35 K" spool. Release mechanism 50 (FIG. 1) disengages the "35 K" spool from load 16 thereby causing separation of extraction parachute 56 from assembly 10. FIG. 3B shows stabilizing parachute 44 being deployed. This is accomplished by the detaching force of extraction parachute 56 being delivered by line 46 to the "35 K" spool which is connected to the release mechanism of stabilizing parachute 44.

FIG. 3C shows the stabilizing parachute 44, which allows for the rapid descent of assembly 10, in the fully deployed condition. Assembly 10 remains stabilized by forces delivered thereto via the bridle lines 40 which are connected to stabilizing parachute 44. Also, panel 30 helps stabilize assembly 10 against pitch by imparting aerodynamic qualities to assembly 10.

It is theorized that during the high speed descent the pull of the parachutes is oriented so that the force resulting from any imbalance, such as an oscillation, is applied through a single one of bridle lines 40. It is further assumed that the geometry of bridle 40 will result in the said one line being taut and at a 45° angle to the plane of frame 20. This is only a theory and should not be taken in any way to limit the scope of the present invention.

FIGS. 3D and 3E illustrate the deployment of main recovery parachutes 32. At a designated altitude, barometric sensor 52 of three link spool 36 activates cutter 54, which severs the bridle lines 40 from spool 36. The detaching force of stabilizing parachute 44 pulls upon spool 36, which is connected to the release mechanism of recovery parachutes 32, by line 38. This action deploys main recovery parachutes 32, which reduce the rate of descent and allow a safe landing of assembly 10. The main recovery parachute system may consist of one or multiple parachutes capable of reducing velocity of the load to an acceptable landing level.

While a preferred embodiment has been shown and described, various modifications and substitutions may be made thereto without departing from the spirit and scope of the invention. Accordingly, it must be understood that the present invention has been described by way of illustration and not limitation.

What is claimed is:

1. An improved device for the air dropping of cargo from an aircraft flying at a high altitude comprising:
first platform means, said first platform means having first and second ends, said platform means forming a flat rectangular surface, said platform means supporting the cargo;
two reinforcing means, said two reinforcing means being secured along both sides of said platform means between said first and second ends, said two reinforcing means each forming a supporting truss, said reinforcing means transmitting forces to said platform means;
stabilizing means, said stabilizing means defining two planes, said stabilizing means being attached to said second end of said platform means with said first plane of said stabilizing means being perpendicular to said second end of said platform means and with said second plane of said stabilizing means being extended from said first plane to said two reinforcing means, said second plane of said stabilizing means forming an angle between said first plane and said platform means surface of less than 90°, said stabilizing means transmitting forces to said reinforcing means;

ramp means, said ramp means providing a flat surface, said ramp means being secured to said stabilizing means with the surface thereof lying in a plane parallel to said second plane defined by said stabilizing means;

first parachute means, said first parachute means having an open and a closed condition, said first parachute means being capable of retarding the descent of the cargo when in the open condition so that it can land intact, said first parachute means attached to said first platform means by lines, said first parachute means being positioned above the cargo;

first parachute release means, said first parachute release means holding said first parachute means in said closed condition, said first parachute release means deploying said first parachute means to said open platform when force is applied thereto;

second parachute means, said second parachute means having an open and closed condition, said open condition of said second parachute means allowing a rapid descent of the cargo, said second parachute means in the open condition supplying force to provide restoring torque to the cargo, said second parachute means being secured to said first plane of said stabilizing means;

second parachute release means, said second parachute release means holding said second parachute means in said closed condition, said second parachute release means deploying said second parachute means to said open condition when force is applied thereto;

bridle means, said bridle means securing said second parachute means to said first plane of said stabilizing means, said bridle means secured to each corner of said first plane of said stabilizing means, said bridle means transmitting force from said second parachute means to said stabilizing means;

first connector means, said first connector means being attached to said bridle means, said first connector means also being attached to said second parachute means, said first connector means further being attached to said first parachute release means, said first connector means including a barometric sensor unit and a cutter which is activated by said sensor at a desired altitude, said cutter disconnecting said bridle means from said first connector means when activated;

third parachute means, said parachute means having open and closed conditions, said third parachute means providing a force for extracting the cargo from the aircraft when in the open condition;

second connector means, said second connector means being attached to said third parachute means, said second connector means also being attached to the cargo, said second connector means being further attached to said second parachute release means; and second connector release means, said second connector release means detaching said second connector means from the cargo after extraction from aircraft, said second connector release means being secured to said platform means within a space provided on said reinforcing means.

2. The apparatus of claim 1 wherein said first platform means is a conventional air dropping platform.

3. The apparatus of claim 1 wherein said stabilizing means includes a pair of parallel members attached to the reinforcing means at first ends, said parallel members being connected together at their second ends by a cross member, said members defining said first plane.

4. The apparatus of claim 3 wherein said stabilizing means further includes angular support posts connected at one end to each of said parallel members, said angular support posts being connected at their other end to said reinforcing means.

5. The apparatus of claim 1 wherein said second parachute means is comprised of a single parachute.

6. The apparatus of claim 1 wherein said bridle means is comprised of four lines having their first ends attached separately to the corners of said first plane of said stabilizing means and having their second ends being joined and attached to said first connector means.

7. The apparatus of claim 6 wherein the length of said bridle lines is 4 to 8 from said first plane of said stabilizing means and the plane defined by the confluence point at said first connector means for platform lengths of 8 to 28 feet with cargo weights of 2,500 to 35,000 lbs.

8. The apparatus of claim 1 wherein said first connector means is a free link spool.

9. The apparatus of claim 7 wherein said stabilizing means includes a pair of parallel members attached to the reinforcing means at first ends, said parallel members being connected together at their second ends by a cross member, said members defining said first plane.

10. The apparatus of claim 9 wherein said stabilizing means further includes angular support posts connected at one end to each of said parallel members, said angular support posts being connected at their other end to said reinforcing means.

* * * * *